United States Patent [19]

Sibley et al.

[11] Patent Number: 5,356,227
[45] Date of Patent: * Oct. 18, 1994

[54] SOLID-LUBRICATED BEARING ASSEMBLY

[75] Inventors: Lewis B. Sibley, Paoli; C. Brian Kelly, Secane, both of Pa.

[73] Assignee: Tribology Systems, Inc., Paoli, Pa.

[ * ] Notice: The portion of the term of this patent subsequent to Nov. 19, 2008 has been disclaimed.

[21] Appl. No.: 794,152

[22] Filed: Nov. 18, 1991

Related U.S. Application Data

[63] Continuation-in-part of Ser. No. 374,167, Jun. 29, 1989, Pat. No. 5,066,145.

[51] Int. Cl.$^5$ .................... F16C 33/66; F16C 33/44
[52] U.S. Cl. .................... 384/463; 384/470; 384/520; 384/527
[58] Field of Search .............. 384/463, 470, 520, 523, 384/524, 527, 551, 572, 573

[56] References Cited

U.S. PATENT DOCUMENTS

| | | | |
|---|---|---|---|
| 3,390,928 | 7/1968 | Davies et al. | 384/463 |
| 3,649,093 | 3/1972 | Muratore et al. | 384/463 |
| 3,685,877 | 8/1972 | Gould | 384/470 |
| 3,712,694 | 1/1973 | Smith | 384/520 |
| 4,022,516 | 5/1977 | Smith et al. | 384/520 |
| 4,492,415 | 1/1985 | Baile et al. | 384/463 |
| 4,500,144 | 2/1985 | de Campos | 384/463 |
| 4,534,871 | 8/1985 | Johnson | 384/463 X |
| 4,906,110 | 3/1990 | Van Wyk et al. | 384/463 |
| 5,066,145 | 11/1991 | Sibley et al. | 384/463 |

Primary Examiner—Thomas R. Hannon

[57] ABSTRACT

A solid-lubricated bearing assembly has an outer bearing member with a generally radially inwardly facing race surface formed therein adapted to receive rotatable bearing elements for rotating motion of the rotatable bearing elements respecting the outer bearing member, an inner bearing member having a generally radially outwardly facing race surface formed therein adapted to receive the rotatable bearing elements for rotating motion of the rotatable bearing elements respecting the inner bearing member, a plurality of rotatable bearing elements retained between the race surfaces of the inner and outer bearing members, and at least one spacer circumferentially positioned between the bearing elements for maintaining the bearing elements in spaced relation to one another while permitting rotation of the bearing elements in the races with the spacer including solid lubricant material for depositing a solid lubricant film on the rotatable elements by contact therewith as the rotatable elements rotate against the solid lubricant material.

16 Claims, 14 Drawing Sheets

SOLID-LUBRICATED BEARING ASSEMBLY

CROSS-REFERENCE TO RELATED PATENT APPLICATION

This patent application is a continuation-in-part of copending U.S. patent application Ser. No. 374,167, filed Jun. 29, 1989 and issued as U.S. Pat. No. 5,066,145 on Nov. 19, 1991.

BACKGROUND OF THE INVENTION

1. Field of the Invention

This invention relates generally to bearings and specifically to ball, roller and sleeve bearings having solid lubricants which can operate in adverse environments for long times without necessity of repeated application of lubricating oil or grease.

2. Description of the Prior Art

Ball, roller and sleeve bearings are known and have been used in mechanical devices essentially since the beginning of the industrial revolution. While such bearings are serviceable in wide variety of applications and environments, these bearings have disadvantages. One major disadvantage is the need for lubricating oil or grease to provide adequate lubrication between the moving surfaces, so that friction does not cause the bearings to overheat and self-destruct during operation.

Conventional petroleum-based oil and grease lubricants tend to dry out and/or evaporate over time and generally must be replaced periodically for the bearing to function adequately over its design life. To perform such lubrication, workers require access to the bearings; this means downtime for the associated machinery.

Adequately reliable solid lubricated, high temperature bearing systems do not exist, even though such bearings would reduce maintenance and increase permissible operating temperatures and reliability of the associated machinery.

Use of solid lubricants and dry, wear-resistant materials in low and high temperature bearing applications has been attempted, using molybdenum disulfide, graphite and Teflon. The bearing industry markets several types of dry bearing materials based on such molybdenum disulfide, graphite, Teflon and other plastics to be used as solid lubricants. Woven glass fiber-reinforced Teflon bearings are fabricated by bonding a stiff metal backing to a thin composite layer of soft (but solid) lubricating Teflon, reinforced with a hard glass fabric so that very thin film of Teflon lubricates the glass fibers with a minimum of deflection, plastic flow and wear.

Conventional petroleum-lubricated ball bearing-equipped material handling system trolleys are illustrated in the brochure "Ball Bearing Trolleys" published by FMC Corporation, booklet 710105, available from the FMC Corporation Material Handling Systems Division in Chalfont, Pa.

In some applications, it is desirable to have electrical conductivity between the inner and outer bearing races. Conventional oil or grease lubricated bearings typically are not electrically conductive. Generally the lubricating oil or grease, especially if petroleum-based, is electrically insulative. When a thin film of lubricating oil or grease resides on the bearing surfaces, the thin film electrically insulates the contacting surfaces from one another.

One application in which electrically conductive bearings are necessary is electrostatic spray painting. In many industries parts to be electrostatically spray painted are suspended from trolleys traveling along elevated tracks. A charge is applied to the objects to be painted by applying electrical charge to the elevated track on which the trolleys, carrying the objects, travel. To impart the charge to the objects an electrically conductive path must be provided from the track through the trolley to the object to be painted.

In known electrostatic spray painting systems the limiting factor (in providing an electrically conductive path to the object to be painted) is electrical resistance between the moving surfaces of the bearings, which are part of the electrically conductive path between the trolley wheel and free. This resistance results from the presence of electrically insulative lubricating oil or grease film on bearing surfaces.

Bearings conventionally used in applications requiring electrical conductivity have a major disadvantage: When the electrically insulative lubricating oil or grease film is between the bearing moving surfaces, arcing occurs across the film between the surfaces. This arcing pits the case-hardened metal surfaces, leading to early failure of the metal surfaces and consequent bearing failure.

One approach to providing an electrically conductive bearing has been to equip conventional bearing assemblies with a sliding contact finger riding on (or otherwise structurally connected to) the trolley load-carrying structural member affixed to the inner race of the assembly. The contact finger slides along the track on which the trolley assembly rides, providing an electrically conductive path between the track and the trolley carrying the object to be electrostatically spray painted. This approach has not been successful.

In known solid lubricated bearing applications, sporadic catastrophic bearing failures occur. Reliable, self-contained, solid lubricated bearings are needed to reduce maintenance and to facilitate higher operating temperatures that can greatly improve performance and fuel efficiency of machines.

SUMMARY OF THE INVENTION

This invention provides solid-lubricated ball, roller and sleeve bearing assemblies requiring essentially no conventional lubrication or maintenance. The invention also provides high-temperature solid lubricants and lubrication-facility geometries for ball, roller and sliding bearings.

In one of its aspects, the invention includes an outer bearing ring, an inner bearing ring (with the inner and outer bearing rings including races for retaining balls or rollers of the bearing assembly), a plurality of balls or rollers journaled for rolling contact with respective races of the outer and inner bearing rings and a solid lubricant member biased against one or more of the balls or rollers journaled between the inner and outer rings, with the inner and outer rings connected to load-applying or load-carrying members.

The lubricating member is preferably carbon graphite and is preferably biased against the bearing balls, rollers or other moving surfaces so that the graphite "writes on", i.e. rubs against, the bearing balls, rollers or other moving surface(s), leaving a thin graphite lubricating film thereon. As the bearing operates, the lubricating film is carried by the rotating balls or rollers to the race surfaces against which the balls or rollers are journaled so that a lubricating film forms between the balls or rollers and the race surfaces. The film desirably remains in place for the life of the bearing without subsequent need to apply additional lubricant.

The lubricating member is preferably in the form of a ring fabricated to have an outer diameter slightly larger than a circle defined by regions of contact between the lubricating ring and the bearing balls or rollers. As a result, the lubricating ring is preferably slightly radially inwardly compressed when installed. This inward compression causes the lubricating ring to flex outwardly against the balls or rollers, thereby ensuring good contact between the lubricating ring and the balls or rollers over the life of the bearing, as the ring endeavors to return to its unflexed, relaxed state. This action desirably continuously replenishes the lubricant film as the bearing operates. The lubricating ring is preferably fabricated with an overlap joint facilitating radially inwardly compression when the ring is installed.

In a second aspect, the invention embraces a sleeve bearing in which a solid lubricant, preferably in the form of a ring, may be in the sleeve and biased radially inwardly against a member moving within the sleeve.

In the sleeve bearing aspect of the invention, the solid lubricant may alternatively be in the member moving within the sleeve. In such cases the lubricant material is biased outwardly against the sleeve. A solid lubricant film forms on the contacting moving surfaces, eliminating further need for application of lubricant over the useful life of the bearing.

In another of its aspects this invention provides a cage for a bearing assembly where the cage is fabricated substantially, if not entirely, of solid lubricant material. The pockets in the cage which receive and retain the rotatable elements are preferably oblong in shape, having radius in the circumferential direction (respecting the radius of rotation of the rotatable elements), sufficiently large to prevent any substantial restraint of motion of the rotatable elements in the orbital direction.

In yet another of its aspects, this invention provides insert components, manufactured of solid lubricant material, positioned between rotatable bearing elements in a bearing assembly and movable orbitally with those bearing elements during bearing operation to deposit wear particles of the solid lubricant material on the rotatable bearing elements and the races in which those rotatable bearing elements reside. Preferably the inserts include concave surfaces facing towards the rotatable bearing elements. The radii of curvature of the concave surfaces are preferably larger than the radii of curvature of the surfaces of the rotatable elements towards which the concave surfaces of the solid lubricant material inserts face.

In the aspect of the invention directed to the provision of solid lubricant spacers between adjacent rotatable elements, there is preferably a large circumferential clearance between individual spacers and respective adjacent individual rotatable elements. The large circumferential clearance provides significant lower friction in the bearing assembly and lower wear rates at the rotatable bearing element-race interface.

In the aspect of the invention whereby a solid lubricant material applying cage for the rotatable elements is provided, clearance of the cage pockets respecting the rotatable elements is relatively large. Friction between the cage and an associated ring guide land is maintained low by utilizing, preferably, a low friction solid lubricant material or a plastic composite or even a gas lubricated surface, where the land shape promotes generation of gas lubricant films and consequent low friction.

The radius of curvature of the rotatable bearing element pockets provided in the cage is preferably significantly larger than that of the curved surface portion of the rotatable bearing elements which face the cage.

In the preferred practice of the invention, the solid lubricant material is compressed carbon graphite and includes only sufficient binder to cause the solid lubricant member, in whatever configuration, to retain its shape as the solid lubricant member sacrifices itself to provide lubricant film for the bearing assembly of the invention.

If desired, a small amount of a second solid lubricant can be included. One preferred second lubricant material used as an additive is molybdenum disulfide. In any event, the solid lubricant material is compressed only with sufficient binder to maintain structural integrity of the solid lubricant member.

Other materials which may be used to fabricate the solid lubricant material member portion of the invention are graphite fiber reinforced polyimides, graphite filled polyimide, $Cs_2MoOS_3$ and the like.

In another of its aspects, the invention provides solid lubricant film replenishment into tracks in the race surfaces resulting from elastic deformation as the rotatable bearing elements contact the race surfaces as the bearing operates and the elements rotate. The film replenishment may be made by transfer from compacts and/or coatings directly onto the tracks.

In yet another of its aspects this invention provides replenishment of a solid lubricant film in a bearing assembly by ingestion of very fine particles of solid lubricant debris, which result from wear as the bearing assembly is used and the rotatable elements rotate in tracks in the race surfaces created by elastic deformation of the race surfaces caused by contact by the rotatable bearing elements therewith as the bearing operates and the rotatable elements rotate.

In another of its aspects, this invention provides a bearing assembly utilizing solid lubricant in which orbital restraint of the rotatable elements in the bearings, caused by presence of the solid lubricant structures, is minimized.

The structural configurations of the invention avoid applying excessive load to the solid lubricant replenishing structure and avoid excessive loading of the solid lubricant replenishing structure against the rotatable bearing elements. This prevents the generation of large amounts of wear debris. The geometry provides consistent supplies of submicron size replenishment particles of the solid lubricant material, to continuously supply the required solid lubricant particles to replenish the solid lubricant film on the rotatable bearing elements and the relevant race surfaces.

In all instances, position of the solid lubricant may vary depending on the application in which the bearing is used.

For slow speed applications, in which the generation of solid lubricant transfer films from a lubricant material supply ring (and the generation of lubricant film-replenishing solid-lubricant material from a solid lubricant ring or other solid lubricant supply member) is so slow as to be insufficient for adequate long-life lubricating film replenishment in the bearing, another aspect of the invention comes into play. This aspect of the invention is use of solid-lubricant blocks or spacers between the balls or rollers. Such spacers provide more contacts for transfer filming within the bearing than the ring. Like the ring the spacers must be dimensioned so that they exert minimal restraint in the orbiting component of motion of the balls or rollers. This minimum orbital motion restraint minimizes solid-lubricant film wear on the ball or roller/raceway surfaces in the bearing, which enhances the prospect for reliable long-life operation.

In high speed applications centrifugal forces on the rings or spacers may be high enough to cause excessive wear and stresses. In such applications a cage or separator is preferred, having solid-lubricant material incorporated as inserts or coatings on the contacting surfaces of the cage with the ring guide lands and with the balls or rollers. To minimize orbital restraint of the balls or rollers, the cage pocket clearances must be large in the orbital direction while the guide lands must have low clearance and friction.

Low friction at the cage guide-land surfaces may be provided by low-friction plastic composites or by gas-lubricated step-bearing or by similar geometry on the cage guide lands. Very thin bonded solid-lubricant coatings on the balls or rollers and races provide initial run-in lubrication of the contrasting surfaces in the bearing until the transfer-film mechanism builds up to provide continuous film replenishment for long bearing life.

The solid-lubricant elements avoid high loads on the solid-lubricant film replenishing surfaces. Otherwise, undesirably large particles of solid lubricant material would wear off of the central position of solid lubricant material and the desirable consistent supply of sub-micron "wear" replenishment particles of solid lubricant materials would not result.

The invention uses more open conformity of ball bearing raceways or crowning of roller bearing contacts than used heretofore, to allow sufficient space near the load-carrying contacts in the bearings for solid-lubricant film channelling.

The bearing raceway geometries avoid excessive edge contact with the solid lubricant material; such edge contact might otherwise disrupt the lubricant films on the contacting surfaces. Underlining all of the geometric hardware aspects of the invention is the goal of transferring solid-lubricant films directly onto the bearing surfaces where ball, roller or slider contact occurs while not significantly restraining the orbital motion of the bearing rotatable elements.

While carbon, appropriately bound together with known binders and optionally including one or more known lubricant additives, such a molybdenum sulfide, is the presently preferred material for the solid lubricant, other candidate solid lubricant materials include complex metal chalcogenides specially adapted for high-temperature bearing performance.

DESCRIPTION OF THE PREFERRED EMBODIMENTS AND BEST MODE KNOWN FOR PRACTICING THE INVENTION

Figure 1:
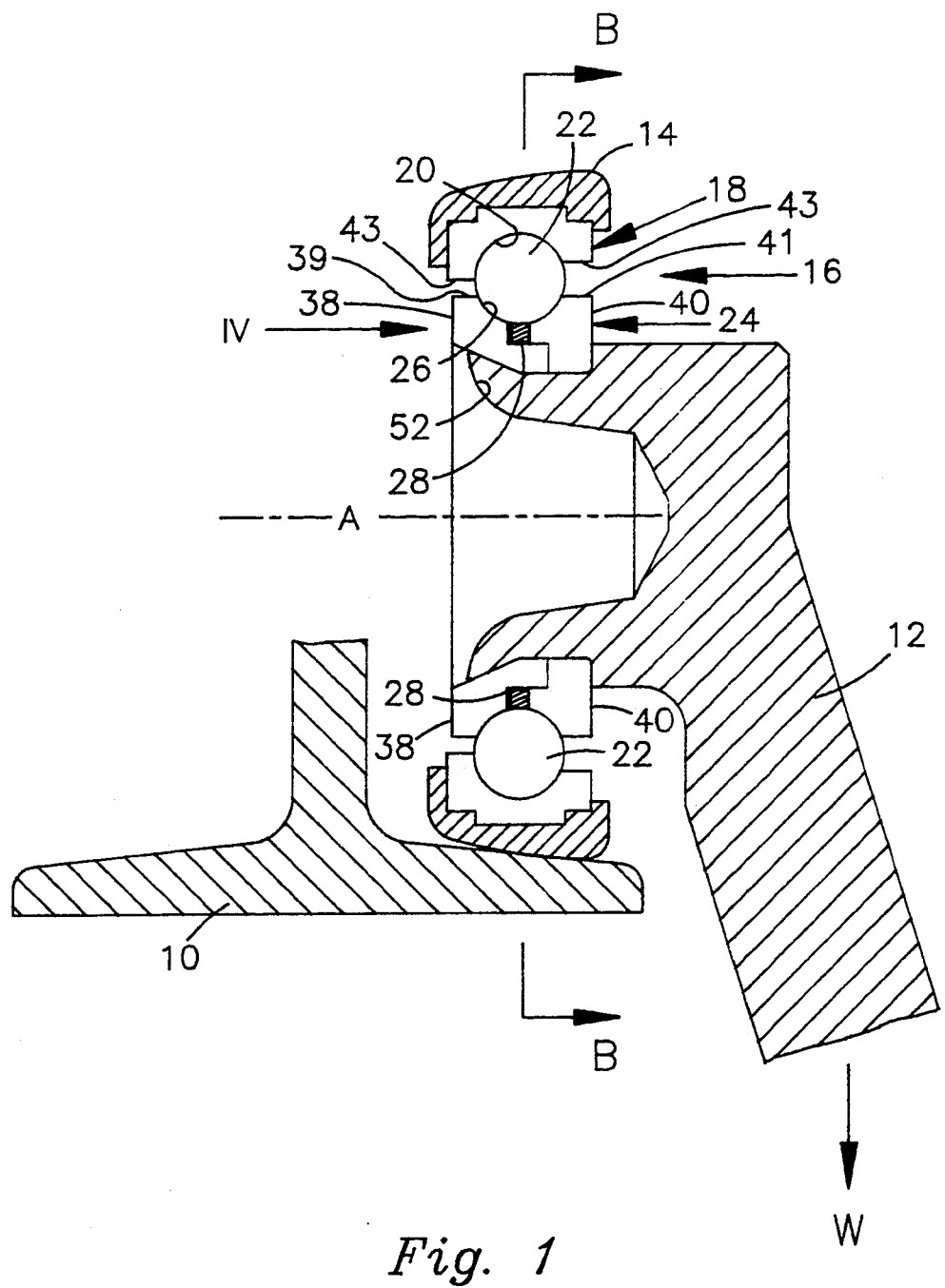
FIG. 1 is a vertical section schematically illustrating a ball bearing assembly manifesting aspects of the invention.

Referring to FIG. 1, a material handling system trolley (not shown) has a wheel 14 riding on a rail 10. A trolley load-carrying member 12 is transported by trolley wheel 14, in order that the trolley may carry a load as wheel 14 moves along rail 10. The rail 10, the trolley load carrying member 12 and wheel 14 are all shown in section. An arrow W denotes a load carried by the trolley.

A bearing assembly denoted generally 16 facilitates rotary motion of wheel 14 with respect to trolley load-carrying member 12 as the trolley moves along rail 10.

Bearing assembly 16 is solid-lubricated and, in the embodiment shown, includes an outer bearing member 18, an inner bearing member 24 and a plurality of rotatable bearing elements 22. Outer bearing member 18 is generally ring-like, as is inner bearing member 24.

An inwardly facing race surface 20 is formed in outer bearing member 18. A corresponding outwardly facing race surface 26 is formed in inner bearing member 24. Race surfaces 20, 26 are configured to receive and to facilitate rotation of bearing elements 22 with respect to race surfaces 20, 26, thereby permitting exceedingly low friction rotary motion of inner bearing member 24 with respect to outer bearing member 18.

Inner bearing member 24 includes lands 39, 41 formed on first and second pieces 38, 40 respectively. Lands 39, 41 are curved, extending circumferentially around the exterior of inner member 24, and define radially outwardly facing annular surfaces of inner member 24.

Figure 6:
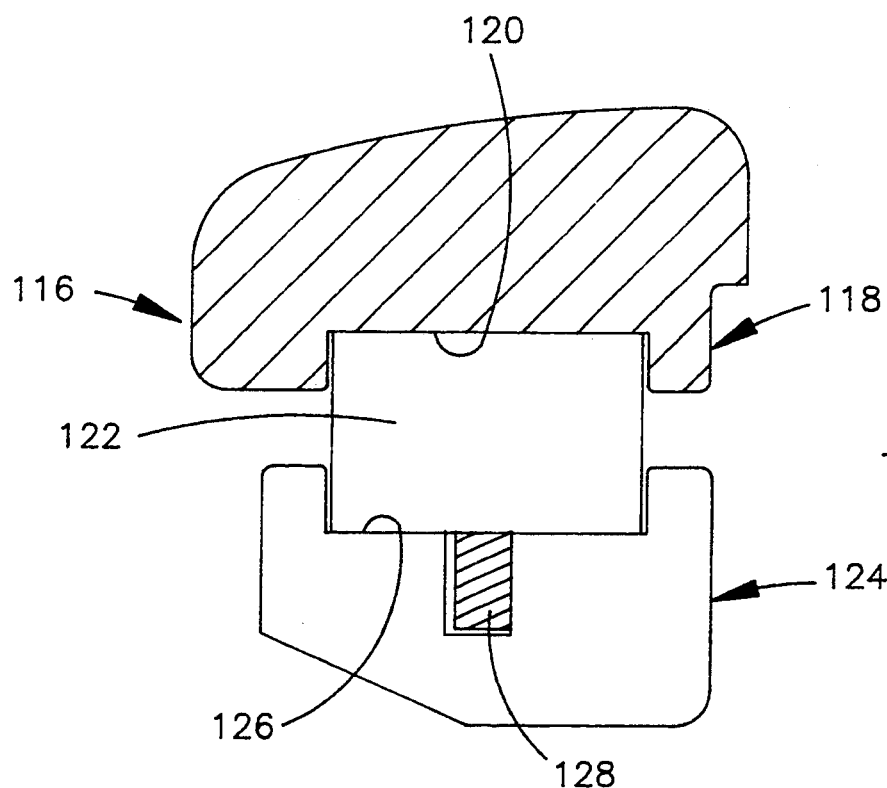
FIG. 6 is a schematic vertical section illustrating a portion of a roller bearing assembly manifesting aspects of the invention.

When the rotatable bearing elements are balls, as illustrated in FIG. 1 and in some of the drawing figures illustrating other embodiments of the invention, namely FIGS. 8, 9, 10, 12, 13, 14, 15 and 20, the inwardly facing race surface such as 20 and the outwardly facing race surface such as 26 typically are arcuate, with constant radii of curvature, to facilitate rotation of the bearing elements such as 22 with respect to the race surfaces such as 20, 26. When the bearing elements are rollers, as illustrated in FIG. 6, the inwardly facing race surface and the outwardly facing race surface are preferably planar in at least one direction, to facilitate rotation of the rollers with respect to the outer bearing member and the inner bearing member.

Rotatable bearing elements 22 are typically positioned in a circular array about an axis of rotation denoted A in FIG. 1 and in FIGS. 12, 14, 15 and 20. Outer bearing member 18 and inner bearing member 24 are preferably and typically symmetrical about axis A; outer bearing member 18 and inner bearing member 24 have not been sectioned in FIG. 1, for drawing clarity.

In the configuration illustrated in FIG. 1, inwardly facing race surface 20 is a continuous surface, extending annularly entirely around axis A, and is concave with respect to axis A. Similarly, outwardly facing race surface 26 is a continuous annularly concave surface extending circumferentially entirely around inner bearing member 24, which in turn extends entirely around axis A.

A ring 28 of solid lubricant material is biased against at least one of the rotatable bearing elements 22. Ring 28 is preferably a carbon graphite material and is formed so that a radially outwardly facing surface 46 of ring 28 contacts at least one and preferably all of the rotatable bearing elements 22. Ring 28 is shown in section in FIG. 1 and is shown in greater detail in FIGS. 2 and 3 where the ring shape is clearly visible.

Figure 4:
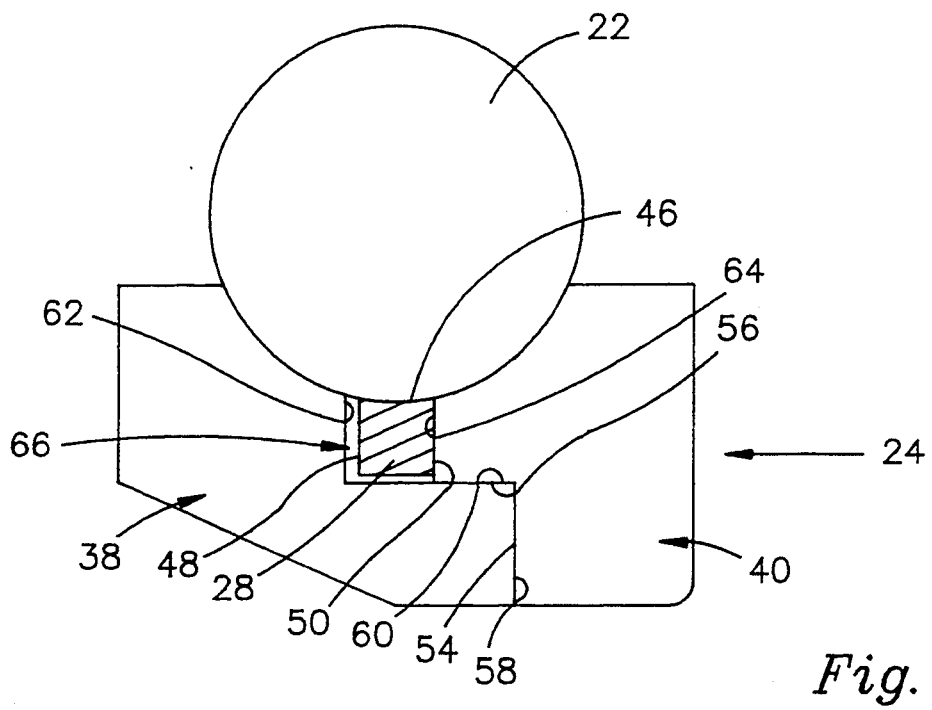
FIG. 4 is an enlarged front view of a portion of the structure illustrated in FIG. 1, taken generally at the area denoted by arrow IV in FIG. 1, illustrating the bearing assembly geometry in that area.

Still referring to FIG. 1 and also referring to FIG. 4, inner bearing member 24 is preferably formed in two pieces. A first piece 38 is shown in greater detail in FIG. 4 and has a planar land 60 as defined by a horizontally extending surface formed therein. A second piece 40 mates with first piece 38 to provide a cavity 66 for residence of ring 28 therewithin.

Bearing assembly 16 is preferably retained in tight contact with wheel 14 by wheel 14 being swaged about outer bearing member 18. Alternatively, inwardly facing race surface 20 may be formed in wheel 14 so that wheel 14 effectively defines outer bearing member 18, i.e. outer bearing member 18 may be an integral part of wheel 14.

Bearing assembly 16 is preferably tightly retained in contact with trolley load-carrying member 12 by inner bearing member 24 being retained in place by swaging an appropriate portion, such as indicated 52 in FIG. 1, of trolley load carrying member 12 against inner member 24. Other methods of mechanically retaining bearing assembly 16 in place may also be used. Inner and outer members 24, 18 may also be integrally formed as parts of load carrying member 12 and wheel 14 respectively.

Ring 28 is preferably radially inward of rotatable members 22, as illustrated in FIG. 1. This configuration permits ring 28 to be compressed to a slightly smaller outer diameter when installed in the position illustrated in FIG. 1. With ring 28 being so-compressed during installation, when in place ring 28 endeavors to relieve internal stresses by expanding radially outwardly, thereby contacting rotatable bearing elements 22.

Use of compressed ring 28, which is preferably made of graphite to serve as the lubricant, eliminates the need for any separate device for biasing lubricant material against bearing elements 22.

Figure 2:
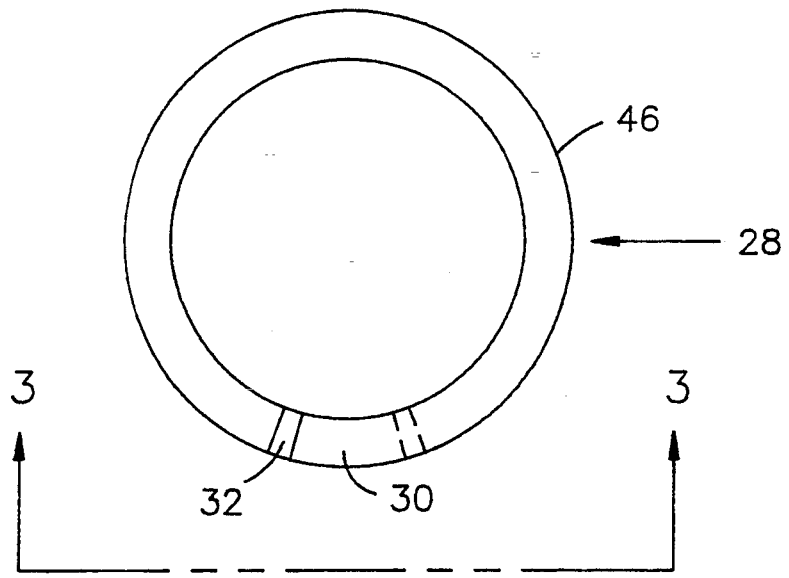
FIG. 2 is a top view of a lubricating ring component of the assembly illustrated in FIG. 1.
Figure 3:
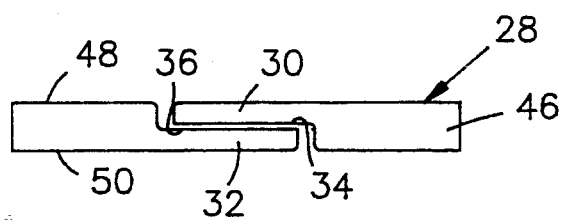
FIG. 3 is front view of the lubricating ring illustrated in FIG. 2, taken in the direction denoted by arrows 3—3 in FIG. 2.

As best shown in FIGS. 2 and 3, ring 28 includes circumferential end portions 30, 32 which overlap one another. As a result, ring 28 is continuous through an angle exceeding 360 degrees when ring 28 is radially uncompressed.

Facing preferably planar surfaces 34, 36 of overlapping end portions 30, 32 of ring 28 facilitate sliding contact of end portions 30, 32 along a sector of ring 28 when the ring is radially compressed. This sliding contact occurs between planar surfaces 34, 36 of first and second circumferential end portions 30, 32 respectively. Surfaces 34, 36 are preferably normal to the axis of ring 28 and parallel to one another. Surfaces 34, 36 are also preferably parallel with axially facing annular surfaces 48, 50 of ring 28.

Referring to FIG. 4, the two-piece construction of inner bearing member 24 facilitates easy machining to provide a cavity, designated 66 in FIG. 4, in which ring 28 resides. Second piece 40 of inner bearing member 24 has a step defined by connecting vertically and horizontally extending surfaces 54, 56. Similarly, first piece 38 of inner bearing member 24 has a step formed by respective vertically and horizontally extending surfaces 58 and 60.

Vertical and horizontal surfaces 54, 56 of second piece 40 fit complementally flush with corresponding vertical and horizontal surfaces 58, 60 of first piece 38 when the bearing is assembled. Horizontally extending surface 60 of first piece 38 is longer (in a direction parallel to the bearing axis of rotation, which is the horizontal direction viewing FIG. 4) than corresponding facing horizontal surface 56 on second piece 40. This disparity in length results in vertical surface 62 of first piece 38 being laterally displaced from corresponding vertical surface 64 of second piece 40, as illustrated in FIG. 4. Lateral displacement of vertical surface 62 from vertical surface 64 creates cavity 66 in which ring 28 resides.

While it is desirable that mutually facing surfaces 62, 64 be vertical and parallel with one another as illustrated in FIG. 4, this is not necessary; surfaces 62, 64 could be formed in a V-shape or some other configuration to define a cavity 66 for housing ring 28. However, with ring 28 having the generally square or rectangular cross-section as illustrated in FIG. 4, it is desirable to have surfaces 62, 64 substantially parallel and substantially vertical. In this manner, when the bearing is assembled and the radially inward compression force on ring 28 has been released, ring 28 can flex radially outwardly and bias itself against rotatable elements 22 without risk of binding or interference between respective annular axially facing surfaces 48, 50 of ring 28 and respective surfaces 62, 64 of first and second pieces 38, 40.

Ring 28 can be of any suitable cross-sectional configuration. The substantially square or rectangular configuration illustrated in FIGS. 1 and 4 is preferred. Ring 28 may be triangular in cross-section, where the base of the triangle contacts rotatable elements such as balls illustrated as 22 in FIGS. 1 and 4.

During operation the graphite material from which ring 28 is preferably made effectively "writes on" the rotatable elements 22 which ring 28 contacts, in much the manner a pencil writes on paper. This "writing" action leaves a thin lubricating graphite film on rotatable elements 22 contacted by ring 28. As elements 22 rotate and contact race surfaces 20, 26, the lubricating graphite film substantially covers race surfaces 20, 26 and substantially covers remaining portions of the surfaces of rotatable elements 22. In a short time, the lubricating graphite film covers substantially all of rotatable bearing elements 22 as well as substantially the entirety of race surfaces 20, 26.

The graphite film, being electrically conductive, facilitates good electrical contact between outer bearing member 18 and rotatable bearing elements 22, and in turn (assuming that elements are an electrically conductive material) between rotatable bearing elements 22 and inner bearing member 24. Because rail 10, trolley load carrying member 12, wheel 14 and the parts of bearing assembly 16 (other than ring 28) may all be ferrous metal, presence of the electrically conductive lubricating film between the rotatable bearing elements 22 and the respective inner and outer bearing members 24, 18 in such case creates an electrically conductive path from rail 10 to an article suspended from load carrying member 12. This electrical conductivity property of the bearing assembly permits the bearing assembly to be used advantageously in industrial applications, such as electrostatic spray painting, where it is necessary or desirable to apply a charge to the objects or to discharge the objects being carried by the trolley.

When high speed operation is important and electrical conductivity is not required, the rotatable bearing elements 22 are desirably ceramic material.

Use of graphite ring 28 to provide lubrication for the bearing assembly 16 eliminates the need for periodic application of petroleum-based lubricants. When using bearing assembly 16, it may be necessary initially to apply a small amount of a petroleum-based lubricant. Necessity for initial lubrication depends on hardness of the graphite employed and speed at which the graphite lubrication member wears and sacrifices itself to form the graphite film on rotatable bearing elements 22 and race surfaces 20, 26 of the inner and outer bearing members. At most, only a small initial application of a petroleum-based lubricant is necessary.

No re-lubrication is needed over the useful life of the bearing; graphite provided by ring 28 satisfies all further bearing lubrication requirements. Hence, the bearing can be used in severe environments in which shutdown for periodic lubrication is undesirable or unfeasible.

Ring 28 is preferably fabricated slightly oversized and is compressed in cavity 66 when the bearing is assembled. Lubricant ring 28 then maintains a slight outward force on the rotatable bearing elements 22. As ring 28 wears, it expands and continues to contact balls 22 thereby providing lubrication as the ring sacrifices itself.

The bearing assembly should be protected from rust after assembly; this is normally accomplished by applying a preservative oil or other protective material to the bearing assembly. When the bearing assembly is used in material handling applications requiring an electrically conductive trolley bearing assembly, the protective material desirably should contain free carbon, preferably graphite, to provide the required electrical conductivity as well as start-up lubrication and surface protection against corrosion.

Bearings using the solid, dry graphite solid lubricant can operate at temperatures ranging from cryogenic levels up to at least about 450 degrees Fahrenheit.

The minute amount of dry lubricant material forming the lubricant film between elements 22 and respective race surfaces 20, 26 makes the bearing assembly especially suitable for applications requiring a high degree of cleanliness. The amount of ring 28 sacrificed to form the lubricating film on elements 22 and race surfaces 20, 26 is so small that it is normally not detectable by the unaided human eye.

Figure 5:
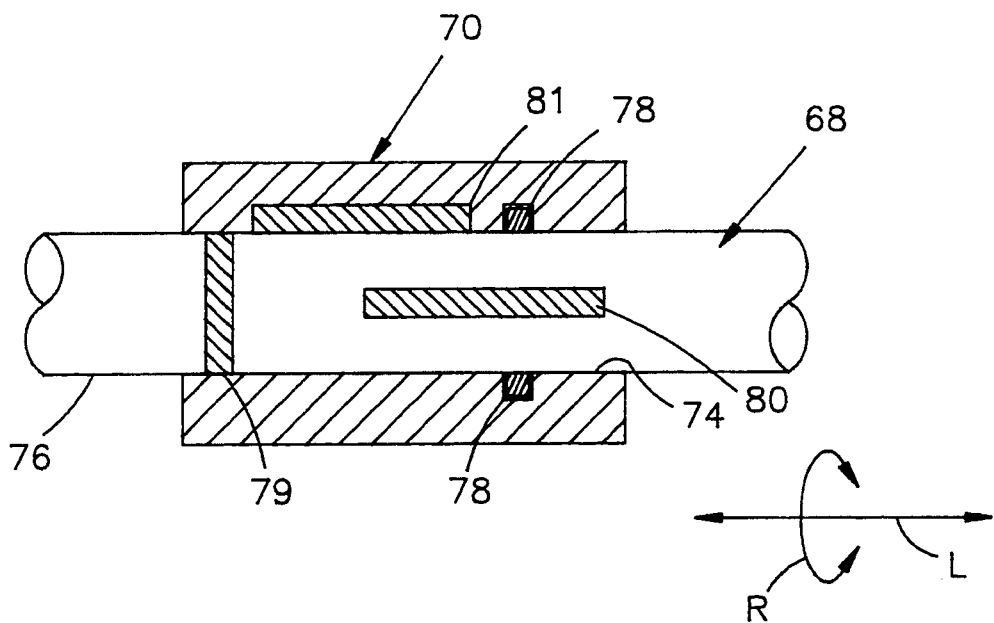
FIG. 5 is a vertical section of a sleeve bearing manifesting aspects of the invention.

Referring to FIG. 5, a sleeve bearing assembly includes a cylindrical inner member 68 journaled within a tubular sleeve 70. Running contact occurs between an inner annular surface 74 of sleeve 70 and an outer circumferential surface 76 of inner member 68. In FIG. 5, while sleeve 70 has been sectioned to schematically illustrate the area at which running contact preferably occurs, running contact need not occur between the entire inner surface of sleeve 70 and inner member 68. Inner member 68 or sleeve 70, or both, may have only portions of their axial lengths formed as annular surfaces operating in running contact with each other.

Inner member 68 is preferably cylindrical about its longitudinal axis so that its outer circumferential surface 76 is cylindrical over the portion of its axial length contacting inner surface 74 of sleeve 70. Inner surface 74 of sleeve 70 is also preferably cylindrical over whatever portion of its axial length it contacts outer surface 76 of inner member 68.

Solid lubricant material is positioned either in sleeve 70, at a portion of inner surface 74 which contacts inner member 18, or in inner member 68 at a portion of surface 76 which contacts sleeve 70, or in both inner member 68 and sleeve 70. Position of the solid lubricant material depends on relative motion of inner member 68 with respect to sleeve 70. If relative motion of inner member 68 is reciprocating longitudinal motion with respect to sleeve 70, in the direction of arrow L in FIG. 5, the lubricant is preferably configured as a ring, having its axis parallel to the longitudinal axis of inner member 68, so that the lubricant is applied about the periphery of inner member 68 as member 68 reciprocates with respect to sleeve 70.

The lubricant material, when configured as a ring, may be either positioned as ring 78 in sleeve 70 or as ring 79 in inner member 68. Ring 78 or 79 preferably is fabricated with a rectangular or other cross-section shape so that ring 78 or 79 presents a planar surface to face the cylindrical surface 76 of inner member 68 or other surface contacted by the ring. The planar surface maximizes the lubricating effect as the ring sacrifices itself and assures that the ring wears in at least a somewhat optimal, self-seating fashion.

If the lubricant is configured as ring 78 and is located in sleeve 70 as shown, ring 78 is preferably fabricated with its inner diameter (measured at the ring surface facing inner member 68) slightly smaller than the outer diameter of inner member 68. With such inner diameter the ring 78, to be installed, must be slightly enlarged. In such case, when installed the ring 78 seeks to return to its unstressed, smaller diameter, contacts inner member 68 and resultingly applies a solid lubricant film to inner member 68.

If the lubricating ring is configured as ring 79 and is located in inner member 68, then ring 79 is preferably fabricated with its outer diameter slightly larger than the inner diameter of sleeve 70 at inner annular surface 74. As a result, when it is compressed in place, ring 79 seeks to return to its unstressed state and expands to contact the inner surface of sleeve 70, applying a lubricating film to the interior of sleeve 70 at surface 74 as the bearing operates.

If motion of inner member 68 relative to sleeve 70 is only rotational about the axis of inner member 68, with such motion being indicated by arrow R in FIG. 5, the solid lubricant is preferably configured as an axially elongated strip preferably extending axially over the length of running contact between the respective contacting annular bearing surfaces of sleeve 70 and inner member 68. One such possible configuration is illustrated by strip 80 mounted in inner member 68.

When the solid lubricant material is configured as a strip, such as strip 80 illustrated in FIG. 5, to lubricate a sleeve bearing where the relative motion between the sleeve and the inner member is rotational, the strip of solid lubricant material should extend over the axial length of the area of running rotational contact between inner member 68 and sleeve 70. In such case, strip 80 is preferably parallel to the longitudinal axis of inner member 68; however this is not required.

Alternatively, where relative motion of inner member with respect to sleeve 70 is only rotational, the lubricant strip may be positioned in the wall of sleeve 70, as exemplified by strip 81. The strip of solid lubricant material should extend axially over the length of the area of running rotation contact between inner member 68 and sleeve 70. Strip 81 has not been so-illustrated in FIG. 5, to avoid drawing clutter.

In either case in a sleeve bearing, where the lubricant material is disposed as a strip, in either inner member 68 or in sleeve 70 (or even in both), means such a spring or compressed resilient plastic is desirably provided for biasing the strip to contact the facing moving surface, over the entire area of contact between the inner member and the sleeve.

While the invention has been described above with respect to FIGS. 1 and 4 as including balls as rotatable bearing elements 22, the rotatable bearing elements may equally well be rollers to define a roller bearing assembly.

Referring to FIG. 6, the rotatable bearing elements may be defined by rollers 122 retained between an outer bearing member 118 and an inner bearing member 124 to define a bearing assembly designated generally 116 in FIG. 6. Rollers 122 are journaled in an inwardly facing race 120 formed in outer member 118 and an outwardly facing race 126 formed in inner bearing member 124. Solid lubricant is preferably applied by solid lubricant ring 128 which is preferably radially outwardly biased against rollers 122. This radially outwardly bias of ring 128 is preferably accomplished in the same manner as described above respecting solid lubricant ring 28, namely by fabricating solid lubricant ring 128 in a configuration having an outer diameter slightly larger than the diameter of the circle of interior tangency respecting roller elements 122.

Inner bearing member 124 may be fabricated in the two piece configuration illustrated for inner bearing member 24 in FIG. 4. This two piece configuration facilitates assembly of the bearing with lubricant ring 128 in place.

Other than the substitution of roller elements 122 for rotatable balls 22 and the necessary modification of the inner member 124 and outer member 118 to accommodate rollers 122, all as illustrated in FIG. 6, the configuration of the embodiment of the invention utilizing rollers as the rotatable bearing elements may be substantially that illustrated in FIG. 1.

Figure 7:
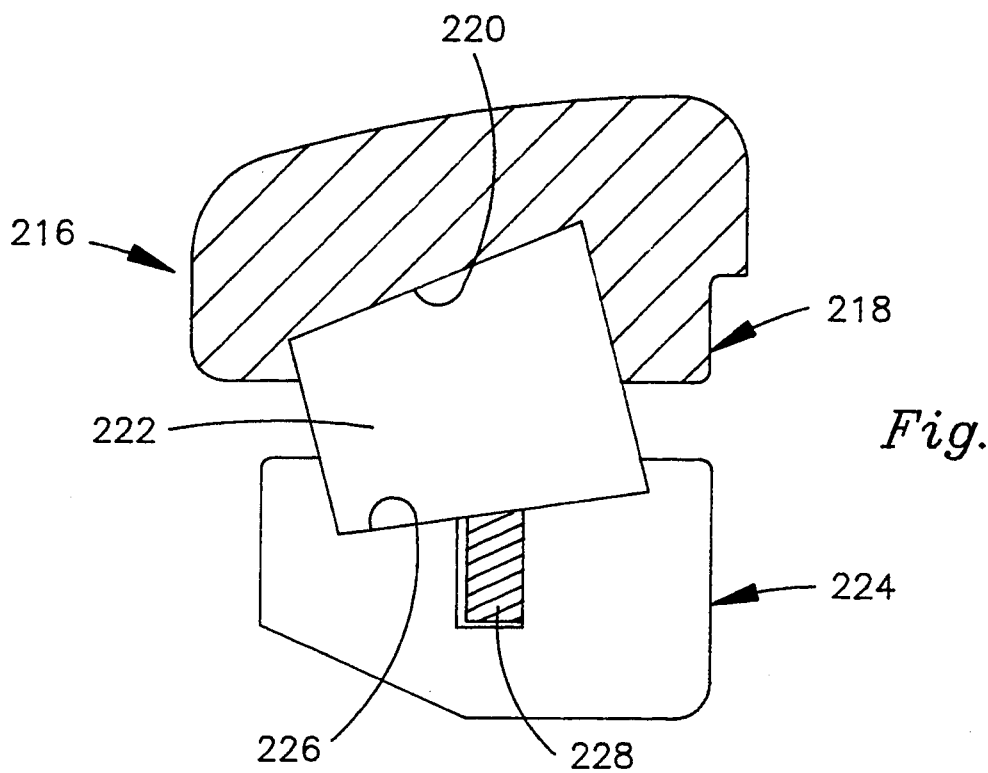
FIG. 7 is a schematic vertical section illustrating a portion of a tapered roller bearing assembly manifesting aspects of the invention.

When the invention is practiced utilizing roller bearings, the rollers may be tapered to define a tapered roller bearing assembly. This is illustrated in FIG. 7 where tapered rollers, defined as rotatable bearing elements 222, are journaled in an inwardly facing race 220 and an outwardly facing race 226. Inwardly facing race 220 is formed in an outer member 218 while outwardly facing race 226 is formed in an inner member 224.

A ring of solid lubricant material 228 resides within a cavity formed in inner bearing 224 and is preferably self-biased against rotatable tapered roller bearing element 222 in the same manner as described above respecting solid lubricant rings 28 and 128 in connection with FIGS. 1 through 4 and FIG. 6 respectively. Other than the modifications of inner and outer members 224, 218 to provide suitably configured races 220, 226 for rotatable journaling of tapered roller bearing elements 22 therein, the tapered roller bearing embodiment of the invention illustrated in FIG. 7 may utilize the structure illustrated in FIGS. 1 and 4, where balls define the rotatable bearing elements.

In the embodiments illustrated in FIGS. 6 and 7, because the rotatable elements are rollers, as contrasted to the balls illustrated in FIGS. 1 and 4, and accordingly are constrained to rotate about only one axis, it might be questioned as to how solid lubricant materials supplied by rings 128, 228 spreads over the areas defined by races 120, 126, 220, 226 and the curved surfaces 122, 222. Solid lubricant material is transferred directly from rings 128, 228 to curved surfaces 122, 222. This solid lubricant material then wears, spreading to form a solid lubricant film on the curved surfaces of rollers 122, 222. As the solid lubricant material wears, the film produces a "smoke" of solid lubricant material, which is entrapped between rollers 122, 222 and their respective spaces 120, 126 and 220, 226. The entrapped "smoke" of solid lubricant material spreads as a film on the surfaces of the races thereby providing lubrication over the entire wear area of rollers 122, 222.

Figure 8:
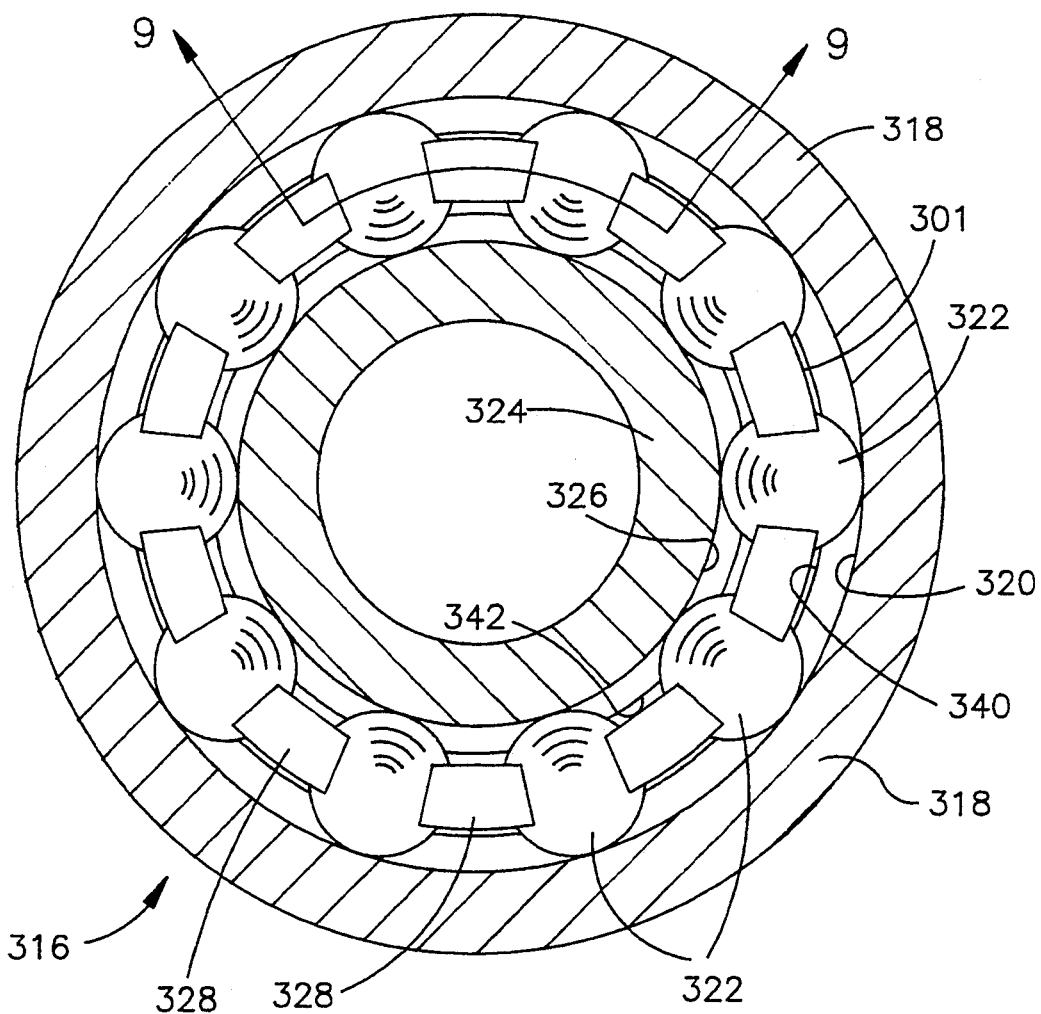
FIG. 8 is a partial sectional side view of a bearing assembly similar to that illustrated in FIGS. 1, 2 and 3, but having solid-lubricant spacers, between the rotatable bearing elements, substituted for the solid lubricant ring. The FIG. 8 section is taken at a position which would be generally analogous to that indicated by arrows B—B in FIG. 1.

FIG. 8 illustrates another embodiment of the invention suitable for use with a trolley wheel such as trolley wheel 14 shown in FIG. 1. In the FIG. 8 embodiment the bearing assembly is denoted generally 316 and includes an outer bearing member 318 having an inwardly facing race surface formed 320 therein. Bearing assembly 316 further includes an inner bearing member 324 having an outwardly facing race surface 326 formed therein. Assembly 316 yet further includes rotatable bearing elements, illustrated in the form of balls 322 journaled in race surfaces 320, 326, to facilitate relative rotational motion between inner and outer bearing members 324, 318. Land 340 is formed on outer bearing member 318. Land 342 is formed on inner bearing member 324. Land 342 formed on outer bearing member 318 corresponds generally to land 43 formed on outer bearing member 18 as illustrated in FIG. 1.

Figure 9:
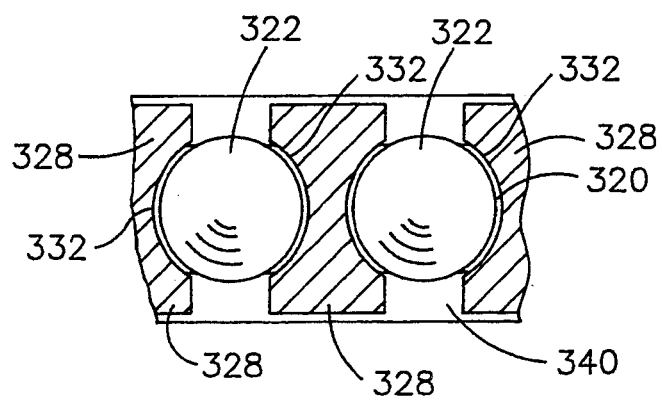
FIG. 9 is a view, partially in section, of the bearing assembly illustrated in FIG. 8, taken generally at arrows 9—9 in FIG. 8.

Bearing assembly 316 yet further includes solid lubricant in the form of homogeneous solid lubricant material spacers 328 positioned between and in contact with rotatable bearing elements 322. Each one of rotatable bearing elements 322 is separated from an immediately adjacent bearing element 322 by a solid lubricant spacer 328 as illustrated in FIG. 9. Each spacer 328 is preferably integrally formed of homogeneous solid lubricant material.

Figure 10:
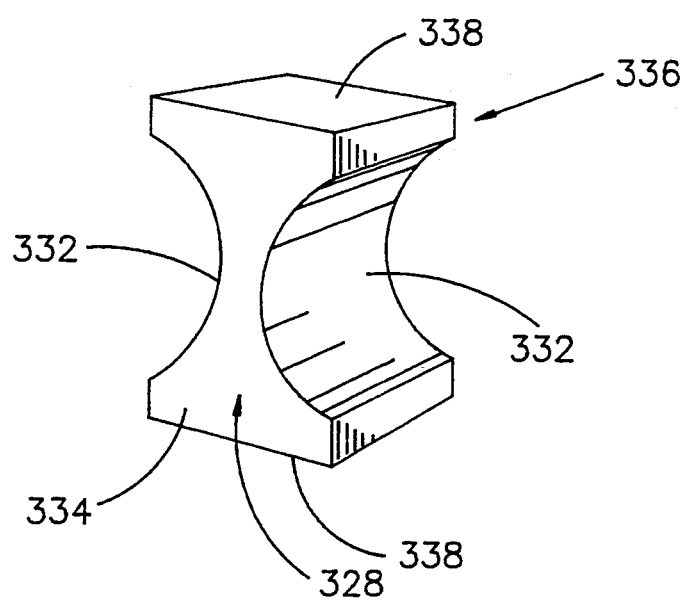
FIG. 10 is an isometric view of a solid lubricant spacer component of the bearing assembly illustrated in FIGS. 8 and 9.

A spacer 328 is illustrated in FIG. 10. Spacer 328 includes two concave wear surfaces 332 which are respectively adapted for contact with adjacent rotatable bearing elements 322 during operation of the bearing. Spacer 328 further includes a radially outwardly facing surface 334, a radially inwardly facing surface 336 and axially oppositely facing surfaces 338 as illustrated in FIG. 10.

Spacers 328 contact the rotatable elements 322 and also may contact lands 340 on outer bearing member 318 shown in FIGS. 8 and 9. In this way the solid lubricant material not only is transferred directly to rotatable elements 322 but solid-lubricant wear debris may be generated at the points of contact of spacer 328 with rotatable elements 322 and with lands 340.

Extra solid-lubricant material debris is formed in the assembly as a result of this spacer-land contact and provides an additional source of material for replenishment of the solid-lubricant film on the load-carrying tracks in the bearing assemblies. This can be a significant advantage in bearing applications where there would otherwise be an insufficient amount of lubricating material debris to provide adequate replenishment of the solid lubricant film in the bearing load carrying tracks. (Such load carrying tracks can result from elastic deformation of the bearing under load as the bearing rotatable elements contact the respective races in which the bearing rotatable elements are journaled.)

An important feature of the embodiment shown in FIGS. 8 and 9 is the curvature of surface 332 in FIGS. 9 and 10 in spacers 328. The curvature of surfaces 332 in spacers 328 is sized so that spacers 328 contact the rotatable elements 322 in such a way that there is a large circumferential clearance between spacers 328 and rotatable elements 322. Low friction torque of the bearing assembly and low wear rates where the rotatable elements contact the race tracks result from this configuration.

Curvature of concave surfaces 332 should be large but not so large that the contacting rotatable elements 322, whether balls or rollers, fall out of the bearing assembly. Desirably, the curvature of concave surfaces 332 should be sufficient that the accumulative clearance between spacers 328 and associated rotatable elements 322, when summed cumulatively around the circumference of the bearing, should be at least as large as one full diameter of the relevant rotatable element, whether a ball or a roller.

Figure 11:
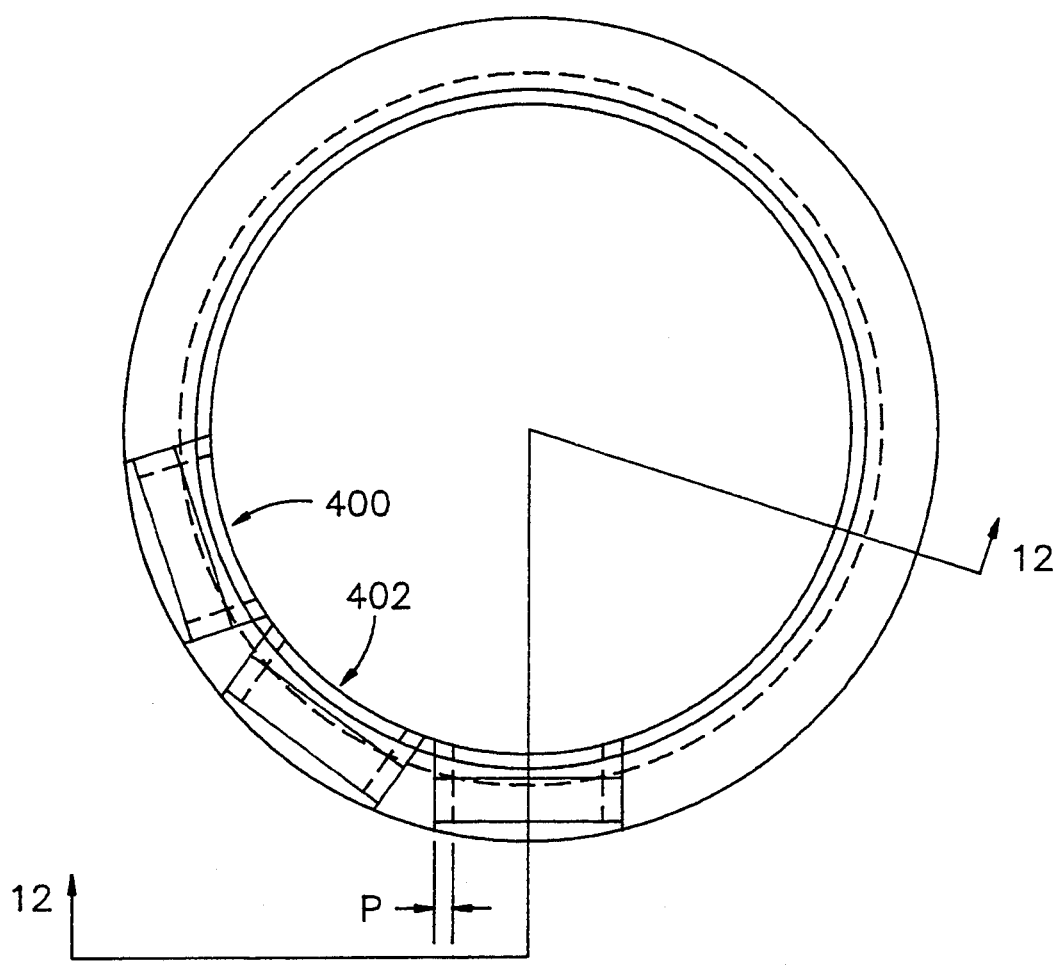
FIG. 11 is an axial view, taken generally at the position indicated by arrows B—B in FIG. 1, schematically representing an embodiment of the invention in which a cage is utilized.
Figure 12:
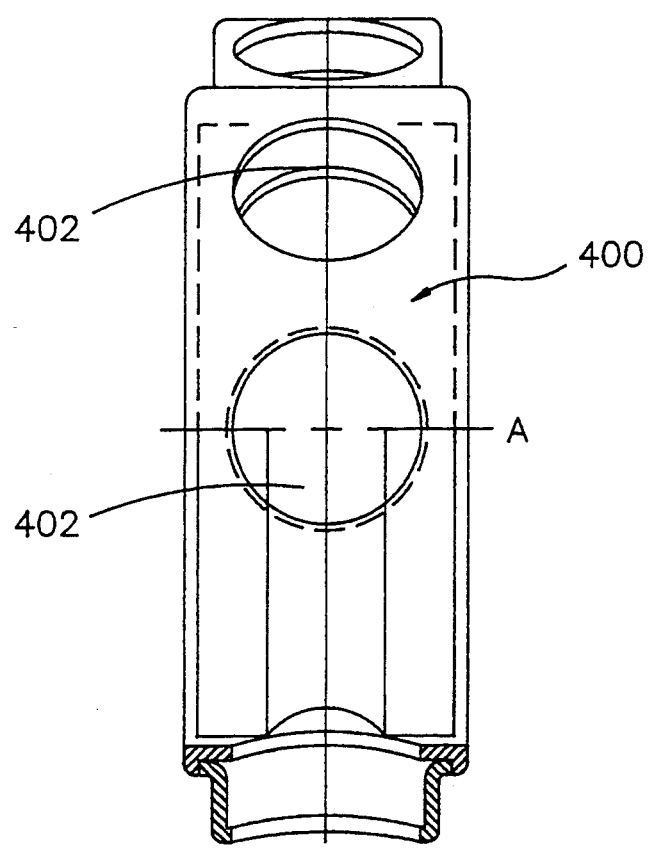
FIG. 12 is a schematic representation of a cage manifesting aspects of the invention, taken at arrows 12—12 in FIG. 11.

Another embodiment of the invention is illustrated in FIGS. 11 and 12 and utilizes a cage to maintain the rotatable elements separated one from another during operation of the bearing assembly.

For very high speed applications, a cage for the rotatable elements as shown generally in FIGS. 11 and 12 may be preferred over the spacer design in FIGS. 8, 9 and 10, to contain the centrifugal forces generated at high speeds without excessive friction and wear of the solid-lubricant components. In FIG. 11, a cage is denoted generally 400 and includes pockets 402 in which individual rotatable elements 422 may reside.

Pockets 402 are illustrated in FIG. 12, which is a sectional view taken along arrows 12—12 in FIG. 11 but rotated ninety degrees to improve drawing understanding.

Figure 13:
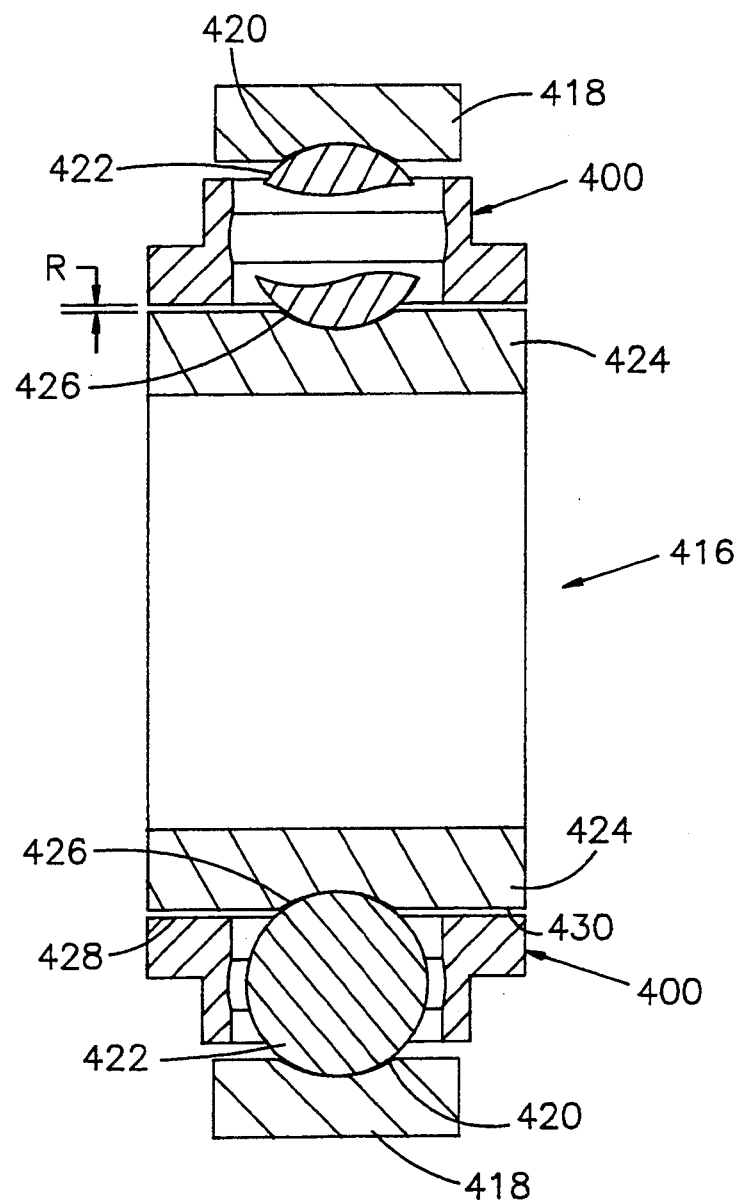
FIG. 13 is a sectional view of an embodiment of the invention utilizing a bearing cage, where the drawing is shown in vertical section corresponding substantially to FIG. 1.
Figure 16:
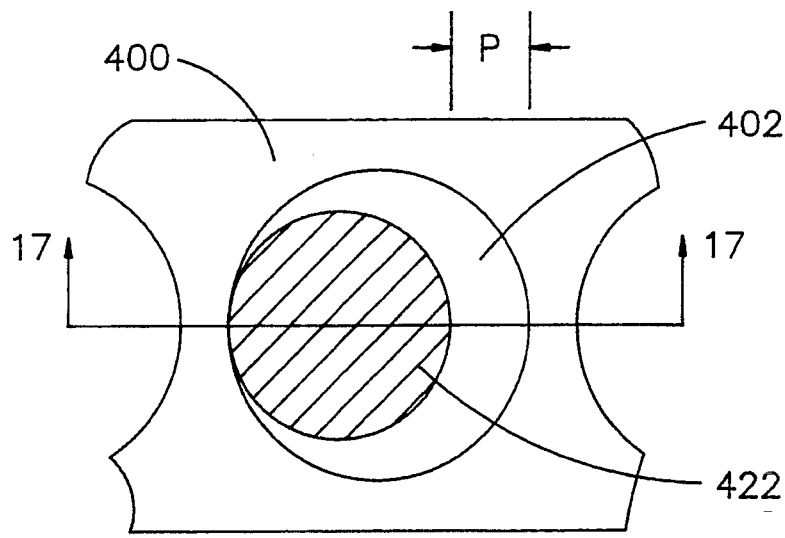
FIG. 16 is a schematic view, partially in section, of a cage and bearing rotatable element, taken at arrows 16—16 in FIG. 15.
Figure 18:
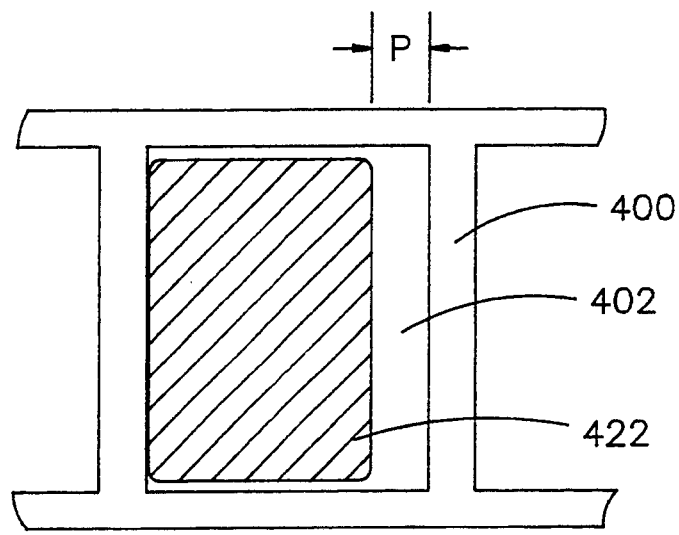
FIG. 18 is a partially broken, partially sectioned schematic view illustrating aspects of the invention in which a solid lubricant material-supplying cage is utilized with roller bearings.
Figure 17:
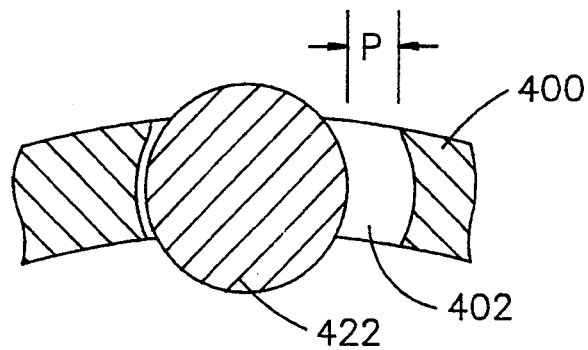
FIG. 17 is a sectional view taken at arrows 17—17 in FIG. 16.
Figure 19:
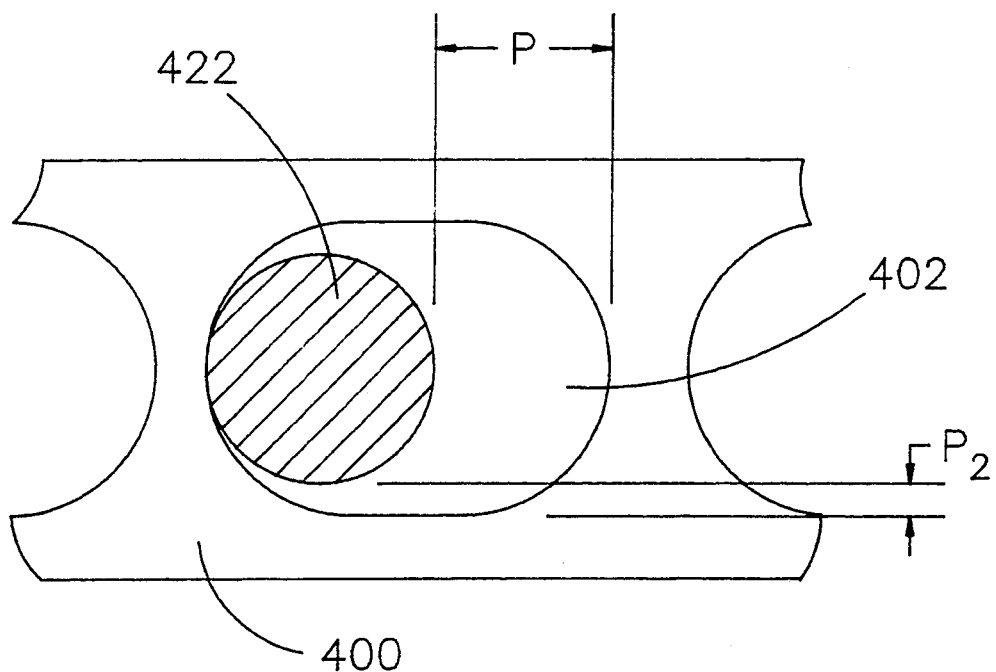
FIG. 19 is a schematic view similar to that of FIG. 16 showing an alternate configuration of pockets formed in the cage.

Pockets 402 formed in cage 400 preferably have much larger clearance, at least in the circumferential direction, than the guide-land clearance identified by dimensional arrow R in FIG. 13. In this regard, pocket clearance is illustrated in FIGS. 16, 17 and 19 in connection with ball rotatable elements and in FIG. 18 in connection with a roller rotatable element. Pocket clearance, indicated by dimensional arrow P in FIGS. 16 through 19, is the distance separating the pocket interior surface from the rotatable element exterior surface, when the rotatable element contacts the cage pocket at a position one hundred eighty degrees opposed from the position at which the distance separating the pocket concave surface and the rotatable element convex exterior surface is measured. This is best illustrated in FIGS. 16 through 19.

Another important parameter respecting the cage aspect of the invention is "ring guide-land" clearance. This parameter is defined as the distance separating the interiorly facing surface of the cage from the exteriorly facing surface of the inner bearing member 424, measured at a position diametrically opposite a point of contact between the interiorly facing cage surface and the exteriorly facing curved surface of inner bearing member 424. The "ring guide-land clearance" is indicated by dimensional arrow R in FIGS. 13, 14 and 15. (Note that in these drawing figures, for purposes of drawing clarity, the cage 400 and the inner bearing member 424 have not been illustrated in contact with one another at the position diametrically opposite that at which the ring guide-land clearance has been indicated by dimensional arrow R.)

In the embodiments of the invention illustrated generally in FIGS. 11 through 19, a bearing assembly 416 includes an outer bearing member 418 having an inwardly facing race surface 420 formed therein. The bearing assembly yet further includes an inner bearing member 424 having an outwardly facing race surface 426 formed therein.

An important parameter respecting the embodiments of the invention illustrated generally in FIGS. 11 through 19 is the clearance between the rotatable elements 422 and the cage pockets 402 in the axial direction. This parameter is identified by dimensional arrow P1 in FIGS. 14 and 15. For such a cage 400 to provide reliable long-life performance, it is necessary for the pocket clearance P in FIGS. 16 through 19 with respect to the rotatable elements 422 to be very much larger than the ring guide-land clearance R in FIGS. 13 through 15, and it is also necessary that the friction of cage 400 on the ring guide lands 428, 430 be very low. Such low-friction can be achieved using plastic composites or gas-lubricated surfaces with either tapered-land or step-bearing shapes, to promote generation of gas-lubricant films with resultant very low friction.

Figure 14:
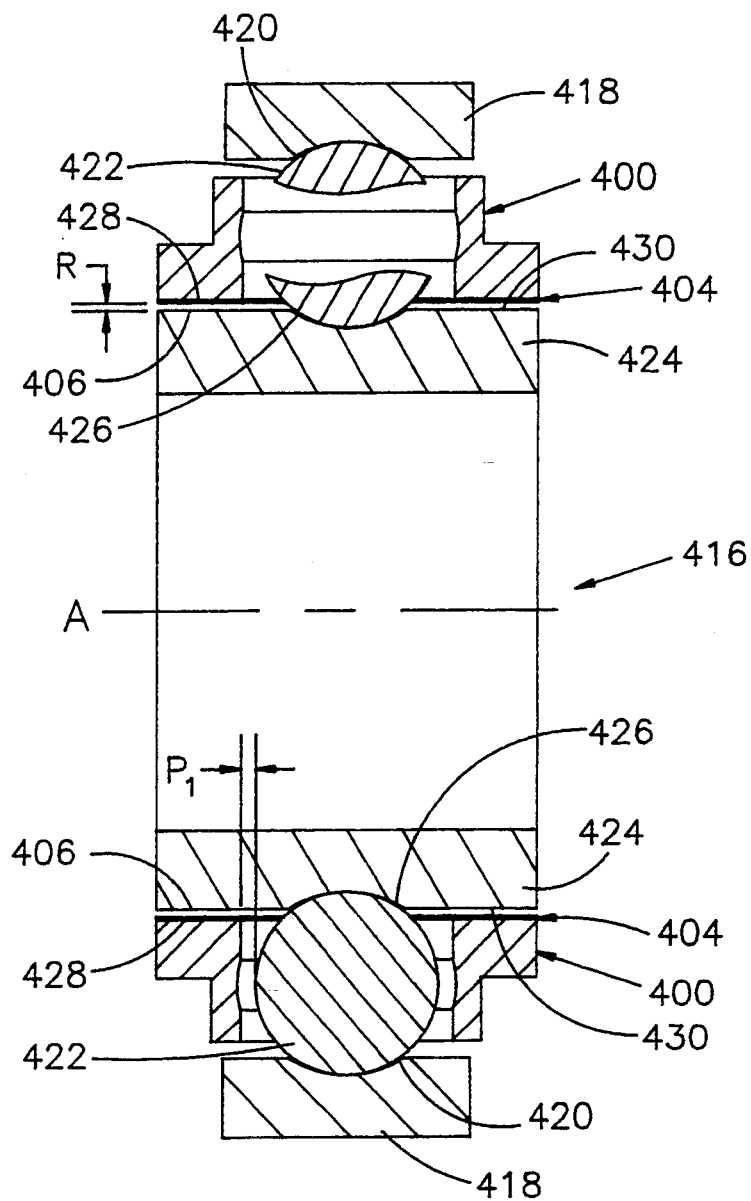
FIG. 14 is a vertical section of a bearing assembly, including a cage, manifesting aspects of the invention.

Referring to FIG. 14, a layer of solid lubricant material 404 may be provided at the annularly inwardly facing surface 406 of cage 400. This layer of solid lubricant material is preferably provided as a composite in the sense that layer 404 is preferably bonded or otherwise affixed to annularly inwardly facing surface 406 of cage 400. Providing such a layer of solid lubricant material in such position reduces friction between cage 400 and the inner ring guide lands 428, 430 which are defined by the annularly outwardly facing surface of inner bearing member 424 on either side of outwardly facing race surface 426. This may be important to facilitate orbital motion of the cage together with the rotatable elements thereby to provide minimal or no restraint on the orbital motion of the rotatable elements 422.

Figure 15:
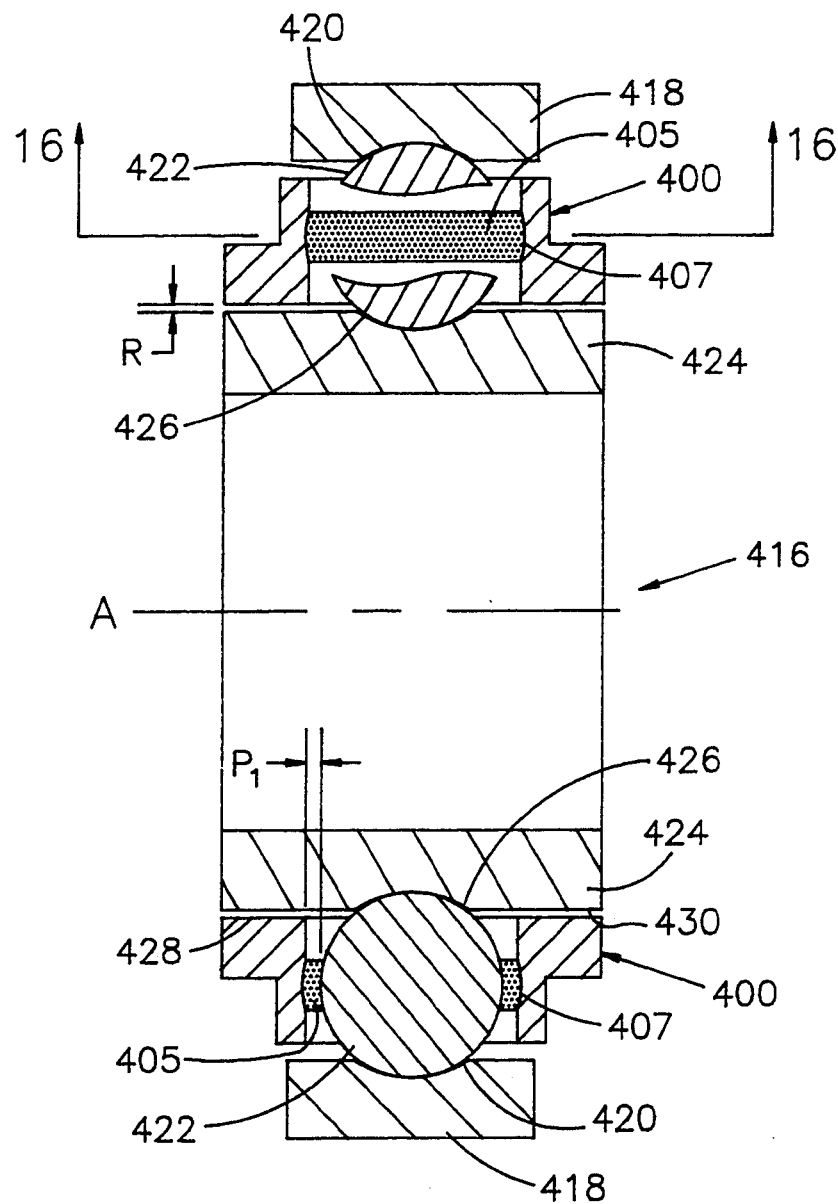
FIG. 15 is a vertical section of a bearing assembly, including a cage, manifesting aspects of the invention.

Referring to FIG. 15, an insert of solid lubricant material 405 may be provided within the interior surface of the cage pockets 402. This solid lubricant material insert is preferably provided as a composite in the sense that the insert 405 is preferably bonded or otherwise affixed to the concave inner surface 407 of cage pockets 402. Providing such an insert of solid lubricant material in such position facilitates transfer of the solid lubricant material to the rotatable bearing elements 422 and creation of the lubricating film of solid lubricant material throughout the bearing assembly as the solid lubricant material is contacted by the rotating element 422 and wears. No restraint on the orbital motion of the rotatable elements 422 results from this approach to applying solid lubricant material to the rotating elements.

The geometry and dimensions of the solid-lubricant supplying member, whether it is provided as a part of cage 400 or by spacers 328 between the rotatable elements (instead of the solid lubricant ring 28) is such that the spacers 328 or cage 400 do not significantly restrain the orbiting motion of the rotatable elements 322, 422 any more than does ring 28. The large pocket clearance in at least the circumferential direction, shown as P in the drawing figures, facilitates freedom of orbital motion. Oblong ball-bearing cage pockets with relatively small clearance P2 in the axial direction are a desirable alternative, as shown in FIG. 19.

Figure 20:
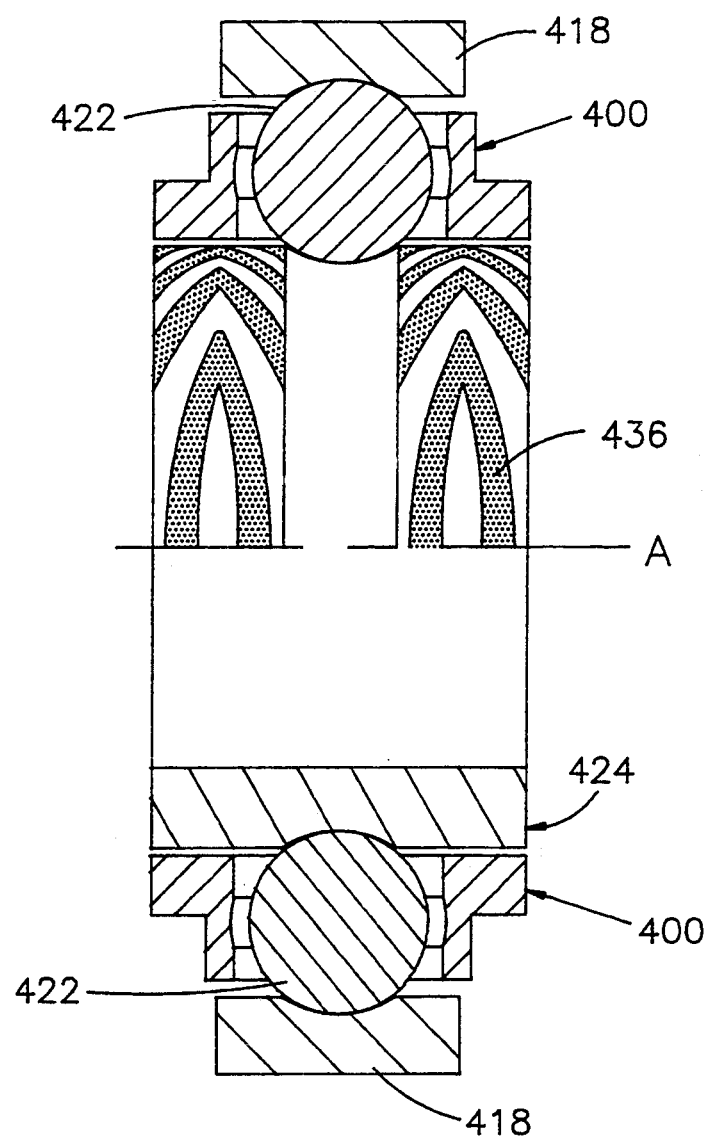
FIG. 20 is a vertical section of a bearing assembly, taken generally in the same position as FIG. 1, illustrating aspects of the invention relating to generation and maintenance of a gas-lubricant film for lubricating rotatable elements in a bearing assembly.

FIG. 20 illustrates an embodiment of the invention in which the inner bearing member has been etched with a chevron-like pattern 436 in two parallel, axially separated annular strips around the periphery of member 424, on either side of the axial location of rotatable bearing members 422. When the chevron-like pattern contacts the solid lubricant material, which may be provided at the position illustrated in FIG. 14, during bearing rotation a gas-lubricant film with submicroscopic particles of solid lubricant material entrained therein results. The gas-lubricant film, which will desirably be maintained in the neighborhood of the chevron pattern, will serve to maintain the rotatable elements in a state where they are essentially continuously bathed in the film of the solid lubricant material. Even if chevron patterned surface 436 does not contact the solid lubricant material, rotation of inner bearing member 424 and consequent generation of circumferential air currents by the action of chevron patterned surface 436 may cause air flow such as to cause the solid lubricant film to avoid axial travel along the inner member 424 away from rotatable bearing members 422, thereby contributing to longer in-place life of the solid lubricant film around the bearing elements 422.

As with the other embodiments, the preferred lubricant material is carbon-graphite. When this graphite is used, the bearing may be made electrically conductive.

The invention also embraces embodiments where the solid lubricant material is a combination of rings and strips and where the solid lubricant has other geometric configurations.

No matter what the embodiment in the invention the solid lubricant material forms a very thin lubricant transfer film along the surface the lubricant abuts, with the film then being carried to other parts of the bearing assembly as the bearing operates and the lubricating member sacrifices itself. The lubricant material intermittently contacts or is biased against a moving surface. This may be accomplished by self bias, by placing the lubricant in compression or in tension, depending on the configuration of the solid-lubricant material.

The presently preferred material for the lubricant is compressed carbon-graphite, including only enough binder to hold the solid lubricant member together to retain its shape. A small, suitable amount of a second solid lubricant additive material can also be included, as needed for a particular application; a preferred second lubricant material used as a lubricant additive is molybdenum disulfide. However, it is to be understood that the presently preferred material is compressed carbon, with binder material added only in the amount required to maintain the structural integrity of the lubricant member as it sacrifices itself to provide the lubricant film for the bearing assemblies of the invention.

With respect to other candidate materials for the solid lubricant member, in addition to graphite fiber reinforced polyimides and graphite filled polyimide, other new lubricating solids are being synthesized and evaluated; the most promising of these solids are incorporated into graphite-type chemical compositions which may be suitable for use in the bearing assemblies of the invention. An example of a specific compound used is $Cs_2MoOS_3$ which has exceptional thermal stability approaching 1650 F. The molybdate structure forms insitu protective films on a wide variety of different surfaces and appears to be highly suitable for use in bearing assemblies manifesting the invention.

While the preferred embodiments of the invention have been described above and alternative embodiments have also been described, the scope of protection to which the invention is believed entitled is defined by the claims and by equivalents thereto which perform substantially the same function in substantially the same way to achieve substantially the same result as set forth in the claims, so long as such substantial equivalents, as defined by a claim for such substantial equivalent, do not read on the prior art.

The following is claimed:

1. A solid-lubricated bearing assembly comprising:
   a. rotatable bearing elements having an arcuate outer surface of constant radius of curvature and constant diameter to facilitate rotation of said elements;
   b. an outer member having a generally radially inwardly facing annular race adapted to receive said bearing elements for rotating motion thereof respecting said outer member;
   c. an inner member having a generally radially outwardly facing annular race adapted to receive said bearing elements for rotating motion thereof respecting said inner member, said bearing elements being retained between said races of said inner and outer members; and d. spacer means circumferentially positioned between said bearing elements for maintaining said bearing elements in spaced relation to one another while permitting rotation of said elements in said races, comprising i. a concave surface formed therein facing each of said bearing elements, said concave surface having a radius of curvature larger than the radius of curvature of the portion of said bearing element which said concave surface faces;

ii. circumferential clearance between the concave surface of said spacer means and the arcuate surface of each of said bearing elements which said concave surface faces, the sum of each of said clearances being greater thn said diameter of said bearing elements; and iii. solid lubricant material for depositing a solid lubricant film on at least one of said bearing elements as said element rotates respecting said races.

2. The bearing assembly of claim 1 wherein said spacer means further comprises means for depositing said solid lubricant film on at least one of said elements, as said element rotates respecting said races, by contact with said element.

3. The bearing assembly of claim 2 wherein said spacer means comprises a cage.

4. The bearing assembly of claim 3 wherein said cage has a concave solid lubricant material surface formed therein facing said bearing element, with the radius of curvature of said concave surface being larger than radius of curvature of the portion of said element which said concave surface faces.

5. The bearing assembly of claim 3 wherein
said inner member has annular surfaces in running contact with said cage during bearing operation,
said annular surfaces having an axial length greater than said diameter of said bearing elements.

6. The bearing assembly of claim 3 wherein
said inner member has annular surfaces in running contact with said cage during bearing operation, further comprising
solid lubricant material on at least one of said surfaces of said inner member and said cage that are in running contact during bearing operation.

7. The bearing assembly of claim 6 wherein said solid lubricant material is on said surface of said cage which is in running contact with said inner member during bearing operation.

8. The bearing assembly of claim 1 wherein said spacer means is homogeneous solid lubricant material.

9. The bearing assembly of claim 8 wherein said spacer means further comprises a plurality of discrete pieces of solid lubricant material positioned between adjacent bearing elements.

10. The bearing assembly of claim 9 wherein said pieces are unconnected.

11. A solid-lubricated bearing assembly comprising:

a. rotatable bearing elements having an arcuate outer surface of constant radius of curvature and constant diameter to facilitate rotation of said elements;

b. an outer member having a generally radially inwardly facing annular race adapted to receive said bearing elements for rotating motion thereof respecting said outer member;

c. an inner member having a generally radially outwardly facing annular race adapted to receive said bearing elements for rotating motion thereof respecting said inner member, said bearing elements being retained between said races of said inner and outer members; and d. spacer means circumferentially positioned between said bearing elements for maintaining said bearing elements in spaced relation to one another while permitting rotation of said elements in said races, said spacer means in running contact with at least one of said first and second members during bearing assembly operation, comprising i. a concave surface formed therein facing each of said bearing elements, said concave surface having a radius of curvature larger than the radius of curvature of the portion of said bearing element which said concave surface faces;

ii. circumferential clearance between the concave surface of each of said spacer means and the arcuate surface of each of said bearing elements which said concave surface faces, the sum of each of said clearances being greater than said diameter of said bearing elements;

iii. solid lubricant material for depositing a solid lubricant film on at least one of said bearing elements as said element rotates respecting said races.

iv. means for depositing said solid lubricant film at said position of running contact between said spacer means and said at least one of said members as said elements rotate respecting said races.

12. A solid-lubricated bearing assembly comprising:

a. an outer bearing member having a generally radially inwardly facing race surface formed therein adapted to receive rotatable bearing elements for rotating motion of said rotatable bearing elements respecting said outer bearing member;

b. an inner bearing member having a generally radially outwardly facing race surface formed therein adapted to receive said rotatable bearing elements for rotating motion of said rotatable bearing elements respecting said inner bearing member;

c. a plurality of said rotatable bearing elements retained between said race surfaces of said inner and outer bearing members and being formed of ceramic material;

d. solid lubricant material internally self-biased against and contacting at least one of said rotatable bearing elements for depositing a film of said solid lubricant material on said rotatable element by contact therewith as said rotatable elements rotate against said race surfaces.

13. The bearing assembly of claim 12 wherein said solid lubricant material contacts substantially all of said rotatable bearing elements.

14. The bearing assembly of claim 12 wherein said solid lubricant material is a ring.

15. The bearing assembly of claim 14 wherein said solid lubricant material is in the form of a ring and is radially inward of said rotatable elements.

16. The bearing assembly of claim 15 wherein said ring is inwardly compressed by said rotatable bearing elements.

* * * * *